United States Patent
Venables et al.

[19]

[11] 3,896,308

[45] July 22, 1975

[54] DETECTOR FOR ELECTRON MICROSCOPES

[75] Inventors: John Anthony Venables, Lewes; Peter John Pollard, Polegate; Barrie William Griffiths, East Grinstead, all of England

[73] Assignee: National Research Development Corporation, London, England

[22] Filed: Jan. 7, 1974

[21] Appl. No.: 431,296

[30] Foreign Application Priority Data
Jan. 10, 1973  United Kingdom................ 1278/73

[52] U.S. Cl. ................ 250/305; 250/310; 250/397
[51] Int. Cl. ............................................ H01j 37/26
[58] Field of Search ........... 250/310, 311, 397, 307, 250/305, 306

[56] References Cited
UNITED STATES PATENTS

| | | | |
|---|---|---|---|
| 3,381,132 | 4/1968 | Okano ............................... | 250/310 |
| 3,714,425 | 1/1973 | Someya.............................. | 250/311 |
| 3,736,422 | 5/1973 | Weber ............................... | 250/311 |

*Primary Examiner*—James W. Lawrence
*Assistant Examiner*—C. E. Church
*Attorney, Agent, or Firm*—Cushman, Darby & Cushman

[57] ABSTRACT

The invention concerns a detector for electron microscopes. The detector is capable of detecting both secondary and reflected primary electrons and can be used either in the reflection or transmission mode. It essentially consists of a channel plate electron multiplier mounted between two electrodes across which a potential can be applied and one or more detector electrodes arranged to receive electrons transmitted through the channel plate.

9 Claims, 2 Drawing Figures

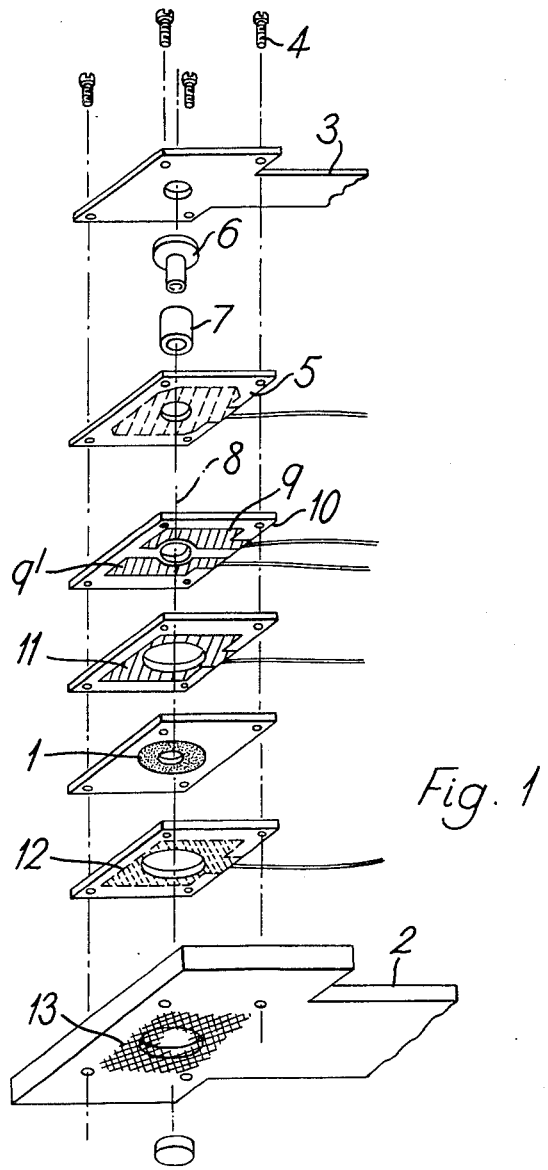
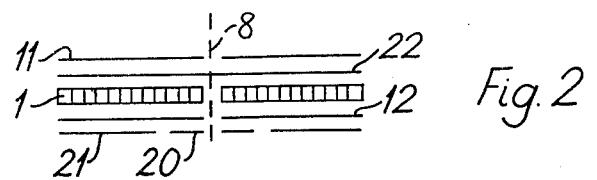
Fig. 1
Fig. 2

DETECTOR FOR ELECTRON MICROSCOPES

The present invention concerns a detector for electron microscopes, and particularly scanning electron microscopes. The detector may be used in either the reflection or transmission mode, although its normal use will be in the reflection mode.

Known detectors for electron microscopes include devices in which a scintillation crystal is offset from the beam axis and a photomultiplier is used to detect events occurring in the crystal.

Another known detector employs a semiconducting barrier device surrounding the beam so as to receive back-scattered electrons.

Both these devices have drawbacks in that they are not paticularly versatile in the information which can be extracted. The barrier detector device is not sensitive to secondary electrons and therefore cannot be used to provide magnetic or voltage contrast. The photomultiplier-scintillator device cannot be easily miniaturised and multiple detectors cannot easily be placed around the specimen to enable, for example, atomic number contrast to be obtained independent of specimen topography.

According to the present invention there is a detector for an electron microscope comprising a channel plate mounted between a pair of electrodes so that a potential can be applied across the channel plate, a grid of highly conductive material to control the field distribution in the specimen region and to select the energies of electrons reaching the channel plate, and a pair of detector electrodes behind the channel plate from which output signals can be taken directly.

An embodiment of the present invention will now be described by way of example and with reference to the accompanying drawings in which FIG. 1 is an exploded view of a detector for an electron microscope constructed in accordance with the present invention.

FIG. 2 is a cross-section through the channel plate of the detector of FIG. 1 but showing a pair of annular detector electrodes and the use of a detector in the transmission mode.

The detector shown in the drawings includes a channel plate 1. This is a fibre-optic electron multiplier with available gains of $10^3$ to $10^6$.

The detector assembly including the channel plate 1 is normally mounted within an earthed aluminium holder 2 by a lid 3 secured to the holder 2 by four nylon screws 4. This ensures that it is thoroughly shielded and further shielding is provided by a mica-clad copper sheet 5. An earthed stainless-steel central aperture 6 surrounded by a nylon sheath 7 ensures that the high voltages applied to the channel plate 1 do not deflect the incident electron beam the path of which is indicated at 8. The electrons from the channel plate output are collected by a pair of copper plates 9, 9' cut out of a glass laminate printed circuit board 10. The channel plate 1 itself is carried by an isulating holder of TEFLON (Registered Trade Mark) and a voltage can be applied across the channel plate by a pair of plates 11 and 12. A wire mask copper grid 13 ensures that the specimen sees the required field at the detector. The grid 13 is normally at earth potential, but it can be biassed to ± 300 volts. The channel plate detector described can be used in a number of different modes. For example without changing any of the components it can be used to collect either secondary electrons or reflected primary electrons.

In the first mode the grid 13 is maintained at earth potential, the plate 11 at 200 volts and the plate 12 at 1,200 volts, whilst the collector plates 9, 9' are at 1,400 volts. In this mode the channel plate collects both secondary and reflected primary electrons. Since there are many more secondaries than reflected primaries the information is mainly derived from the secondaries. However further variations are again possible in the mode in which the information is extracted from the plates 9, 9'. This can either be done in an additive or subtractive manner, that is the output signals from the plates 9, 9' can either be added together or subtracted from one another. In the first additive mode the information thus obtained could be largely topographic thus giving a detailed picture of the surface pattern of the specimen. However little information is given regarding the differing materials of which the specimen may be formed.

If however the first substractive mode is used, then the output will be sensitive to surface electric and magnetic fields. Furthermore there will be a wide solid angle of detection.

The detector can also be used for reflected primary electrons only. In this second mode the grid 13 or the plate 11 is biassed to reject secondary electrons. A typical setting would be to have the grid 13 at earth potential, the plate 11 at −1,200 volts, the plate 12 at −200 volts and the collector plates 9, 9' at earth potential. If the signals from the plates 9, 9' are added then the resultant picture obtained gives good contrast between elements of different atomic numbers in the specimen but little topographical information. For example high atomic number elements give stronger signals than low atomic number elements.

In the subtraction mode with reflected primaries the information derived is again mainly topographical.

It can thus be seen that the channel plate detector described is highly versatile. However its versatility can be improved still further merely by removing the plates 9, 9' and their holder and replacing them with collector plates of different configuration. For example the two D-type plates 9, 9' shown in the accompanying drawing could be replaced by one or more annular plates. Furthermore with annular collector plates the detector would be easily convertible to use in the transmission mode. This is shown in FIG. 2 of the accompanying drawing.

In this figure there is a central collector plate 20 surrounded by an annular collector plate 21 so that bright field images can be obtained from plate 20 and dark field images from plate 21. Furthermore the number of rings can be increased so as to look at various angles of distribution. In this mode of operation it is desirable to repel secondary electrons and this is done either by placing a window 22 of thin foil over the channel plate 1 or by maintaining the grid 13 or the plate 11 at about −200 volts.

The channel plate device can easily be made suitable for baking in an Ultra High Vacuum system, by replacing the components made of Teflon and printed circuit board with a suitable ceramic material.

We claim:

1. A detector for an electron microscope and arranged to be mounted coaxially with regard to the electron beam of the electron microscope and adjacent a speciment to be analysed, the detector comprising a channel plate mounted between a pair of electrodes so that a potential can be applied across the channel plate, a grid of highly conductive material to control the field distribution in the specimen region and to select the energies of the electrons reaching the channel plate and a pair of detector electrodes mounted so that the channel plate is located between a specimen to be analysed and said detector electrodes and conductor means connected to each of said electrodes for directly and separately deriving electrical output signals therefrom.

2. A detector as claimed in claim 1 wherein the channel plate is mounted on an electrically insulated holder, and said electrodes comprise a pair of conductive plates also mounted on electrically insulating holders and having central apertures through which the electron beam of the microscope can pass.

3. A detector as claimed in claim 2 wherein the detector electrodes comprise a pair of plates of highly conductive material mounted on a plate of electrically insulating material on either side of an aperture through which the electron beam of the microscope can pass, each detector electrode having a terminal for connection to electrical measuring equipment.

4. A detector for electron microscopes and arranged to be mounted coaxially with respect to the electron beam of the microscope, said detector comprising a first insulated plate having at least one detector electrode mounted thereon, a second insulating plate carrying a first electrode, a third insulating plate having mounted centrally thereon a channel plate electron multiplier, a fourth insulating plate carrying a second electrode; and a grid of highly conductive metal, and a mounting means for mounting said plates and said grid in the order defined so that they are insulated electrically with respect to one another, electrical contact means whereby an electrical potential can be produced between said first and second electrodes and further electrical terminals whereby an output signal can be taken from said detector plate.

5. A detector as claimed in claim 4, and including an earthed housing of electrically conductive material surrounding said plates and said grid, an earthed electrically conductive cylindrical body mounted in said housing and providing an aperture for the electron beam, a cylindrical sheath of electrically insulating material surrounding said cylindrical body, said cylindrical body and said sheath being provided to prevent deflection of the electron beam by any voltages applied to said channel plate.

6. A detector as claimed in claim 4, wherein said detector plate comprises at least one annular plate through which said electron beam can pass.

7. A detector for an electron microscope and comprising a housing arranged to be mounted above a specimen to be analysed, a first plate having at least one detector electrode mounted thereon, a second plate carrying a first electrode, a third insulated plate having mounted centrally thereon a channel plate electron multiplier, a fourth plate carrying a second electrode, all said plates being of electrically insulating material and being mounted within the housing in the order defined with said first plate arranged to be the closest to the source of the electron beam of the electron microscope, electrical terminal means whereby a potential can be applied across said second and third plates.

8. A detector as claimed in claim 7, and including two detector electrodes mounted on said first plate, said detector electrodes being symmetrically disposed one on either side of an aperture through which the beam of the electron microscope can pass, electrical terminal means being provided for each detector electrode for connection to electrical measurement means.

9. A detector as claimed in claim 7 and provided with two detector electrodes in the form of a pair of concentric annuli each having electrical terminal means whereby output signals can be taken to electrical measurement means.

* * * * *